United States Patent
Seol et al.

(10) Patent No.: US 12,452,224 B2
(45) Date of Patent: Oct. 21, 2025

(54) IMAGE DISPLAY DEVICE AND SYSTEM, AND OPERATION METHOD FOR SAME

(71) Applicant: LG ELECTRONICS INC., Seoul (KR)

(72) Inventors: Seongwoon Seol, Seoul (KR); Taejin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 267 days.

(21) Appl. No.: 17/997,477

(22) PCT Filed: Apr. 29, 2020

(86) PCT No.: PCT/KR2020/005751
§ 371 (c)(1),
(2) Date: Oct. 28, 2022

(87) PCT Pub. No.: WO2021/221215
PCT Pub. Date: Nov. 4, 2021

(65) Prior Publication Data
US 2023/0177133 A1    Jun. 8, 2023

(51) Int. Cl.
*H04L 9/40* (2022.01)
*H04W 12/06* (2021.01)
(Continued)

(52) U.S. Cl.
CPC .......... *H04L 63/08* (2013.01); *H04L 63/0853* (2013.01); *H04W 12/06* (2013.01); *H04W 12/084* (2021.01); *H04W 12/55* (2021.01)

(58) Field of Classification Search
CPC .......... G06F 21/44; G06F 21/35; G06F 21/31; G06F 21/36; G06F 2221/2129;
(Continued)

(56) References Cited

U.S. PATENT DOCUMENTS

2006/0174105 A1    8/2006  Park
2010/0151825 A1*   6/2010  Millet Sancho .... H04L 12/2816
                                                    455/411
(Continued)

FOREIGN PATENT DOCUMENTS

EP          2384040 A1 * 11/2011 ......... H04L 63/0807
JP          2014021733          2/2014
(Continued)

OTHER PUBLICATIONS

PCT International Application No. PCT/KR2020/005751, International Search Report dated Jan. 22, 2021, 3 pages.
(Continued)

*Primary Examiner* — Benjamin E Lanier
*Assistant Examiner* — Brandon Binczak
(74) *Attorney, Agent, or Firm* — LEE, HONG, DEGERMAN, KANG & WAIMEY

(57) ABSTRACT

An image display device including a display; a user input interface; a communication interface which is provided with at least one communication module and transmits and receives a signal including data; a memory; and a control unit for transmitting and receiving data to and from external devices, wherein the control unit performs an authentication procedure pertaining to a first external device based on image display device-related data received from the first external device, receives data, pertaining to a second external device, and at least one control command, related to the control of the second external device, when the authentication procedure is completed, and, when a user input corresponding to one of the one or more control commands is received, transmits a control signal for the control command corresponding to the user input to the second external device based on the data pertaining to the second external device.

11 Claims, 12 Drawing Sheets

(51) Int. Cl.
*H04W 12/084* (2021.01)
*H04W 12/55* (2021.01)

(58) Field of Classification Search
CPC ..... H04L 63/08; H04L 63/0853; H04L 63/00; H04L 63/10; H04L 63/0876
See application file for complete search history.

(56) References Cited

U.S. PATENT DOCUMENTS

| | | | |
|---|---|---|---|
| 2014/0373123 | A1 | 12/2014 | Kang |
| 2015/0089624 | A1 | 3/2015 | Kim et al. |
| 2016/0026786 | A1* | 1/2016 | Thomas .................. G06F 21/32 726/27 |
| 2016/0380997 | A1* | 12/2016 | Blasi .................. H04L 63/0853 726/9 |
| 2018/0240331 | A1* | 8/2018 | Lee ........................ G08C 17/02 |

FOREIGN PATENT DOCUMENTS

| | | |
|---|---|---|
| KR | 1020050032856 | 4/2005 |
| KR | 1020060086679 | 8/2006 |
| KR | 1020130058215 | 6/2013 |
| KR | 1020160111777 | 9/2016 |

OTHER PUBLICATIONS

European Patent Office Application Serial No. 20933743.5, Search Report dated Nov. 22, 2023, 10 pages.

\* cited by examiner

IMAGE DISPLAY DEVICE AND SYSTEM, AND OPERATION METHOD FOR SAME

CROSS-REFERENCE TO RELATED APPLICATION(S)

This application is the National Stage filing under 35 U.S.C. 371 of International Application No. PCT/KR2020/005751, filed on Apr. 29, 2020, the contents of which are all incorporated by reference herein in their entirety.

TECHNICAL FIELD

The present disclosure relates to an image display device, a system, and an operation method thereof.

BACKGROUND ART

An image display device is a device having a function of displaying an image that a user can watch, and a user can watch a broadcast through an image display device. For example, the image display device may include a Television (TV), a monitor, a projector, and the like having a liquid crystal display (LCD) using liquid crystal or an OLED display using an organic light emitting diode (OLED).

In recent years, the function of Internet of Things (IOT), which can access a communication network in a wired/wireless manner and transmit data each other, is being used in various ways for a device such as a lighting system and an interphone, as well as for a general home appliance such as TV, washing machine, air conditioner, and cleaner that perform an unique function and operation in a certain space such as a home or office.

In the case of devices using the Internet of Things function, it may receive a control command corresponding to a user input from a device (e.g., a smart phone) (hereinafter, a master device) receiving a user input through a wired/wireless network, and may perform an operation according to the received control command. Accordingly, a user may control the operation of various devices (hereinafter, referred to as a slave device) just by using a single master device.

Meanwhile, in general, in order that devices using the IoT function are connected to each other and transmit and receive data, or a user controls the operations of various slave devices using the IoT function by using a single master device, it is required that an authentication procedure between the master device and the slave device should be completed, or all information related to the master device or slave devices should be registered one by one in the same server.

In this case, when the manufacturers of devices using the IoT function are different, there is a difficulty in that it is impossible to authenticate between devices, or there is a need to separately develop a unified process for authentication between devices through consultation between manufacturers. Further, when devices of different manufacturers are registered in the same server, there is a risk of security issues regarding information of each device. In addition, when adding a master device, there is also an inconvenience of having to perform the authentication procedure between the added master device and the slave device again one by one.

DISCLOSURE

Technical Problem

The present disclosure has been made in view of the above problems.

The present disclosure further provides an image display device and a system that can add an image display device as a master device by completing authentication between the image display device and other devices, based on data transmitted/received between an existing master device and the image display device that have been authenticated for other devices, and an operation method thereof.

Technical Solution

In accordance with an aspect of the present disclosure, there is provided a method of operating a system including an image display device, a first external device, and a second external device, the method including: an authentication operation of performing an authentication procedure between the image display device and the first external device, when the first external device transmits data related to the image display device to the image display device; a transmission operation of transmitting, by the first external device, data related to the second external device and at least one control command related to a control of the second external device, to the image display device, when the authentication procedure is completed; and a control operation of transmitting a control signal for a control command corresponding to a user input to the second external device based on the data related to the second external device, when the image display device receives the user input corresponding to any one of the at least one control command.

Meanwhile, in accordance with another aspect of the present disclosure, there is provided an image display device including a display configured to display an image; a user input interface unit configured to receive a user input; a communication interface unit configured to have at least one communication module, and transmit and receive a signal including data; a memory; and a controller configured to transmit and receive data to and from an external device through the communication interface unit, wherein the controller performs an authentication procedure for a first external device, based on data related to the image display device received from the first external device through the communication interface unit, receives data related to a second external device and at least one control command related to control of the second external device from the first external device, through the communication interface unit, when the authentication procedure is completed, and transmits a control signal for a control command corresponding to a user input to the second external device, through the communication interface unit, based on data related to the second external device, when the user input corresponding to any one of the at least one control command is received.

Advantageous Effects

The effects of the image display device and the operation method thereof according to the present disclosure will be described as follows.

According to various embodiments of the present disclosure, even if the manufacturers of the image display device and other devices are different, the authentication procedure for the image display device is performed, based on the data transmitted/received between the existing master device and the image display device that have been authenticated for other devices, thereby simply completing the authentication between the image display device and other devices, and simply adding the image display device as a master device with respect to other devices.

In addition, according to various embodiments of the present disclosure, the operation of other devices can be controlled by using an authentication token generated by a server in which other devices are registered, thereby solving the security problem related to the image display device.

Further scope of applicability of the present disclosure will become apparent from the following detailed description. However, it should be understood that the detailed description and specific embodiments such as preferred embodiments of the present disclosure are given by way of example only, since various changes and modifications within the spirit and scope of the present disclosure may be clearly understood by those skilled in the art.

MODE FOR INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

It will be understood that although the terms first, second, etc. may be used herein to describe various elements, these elements should not be limited by these terms. These terms are only used to distinguish one element from another.

Figure 1:
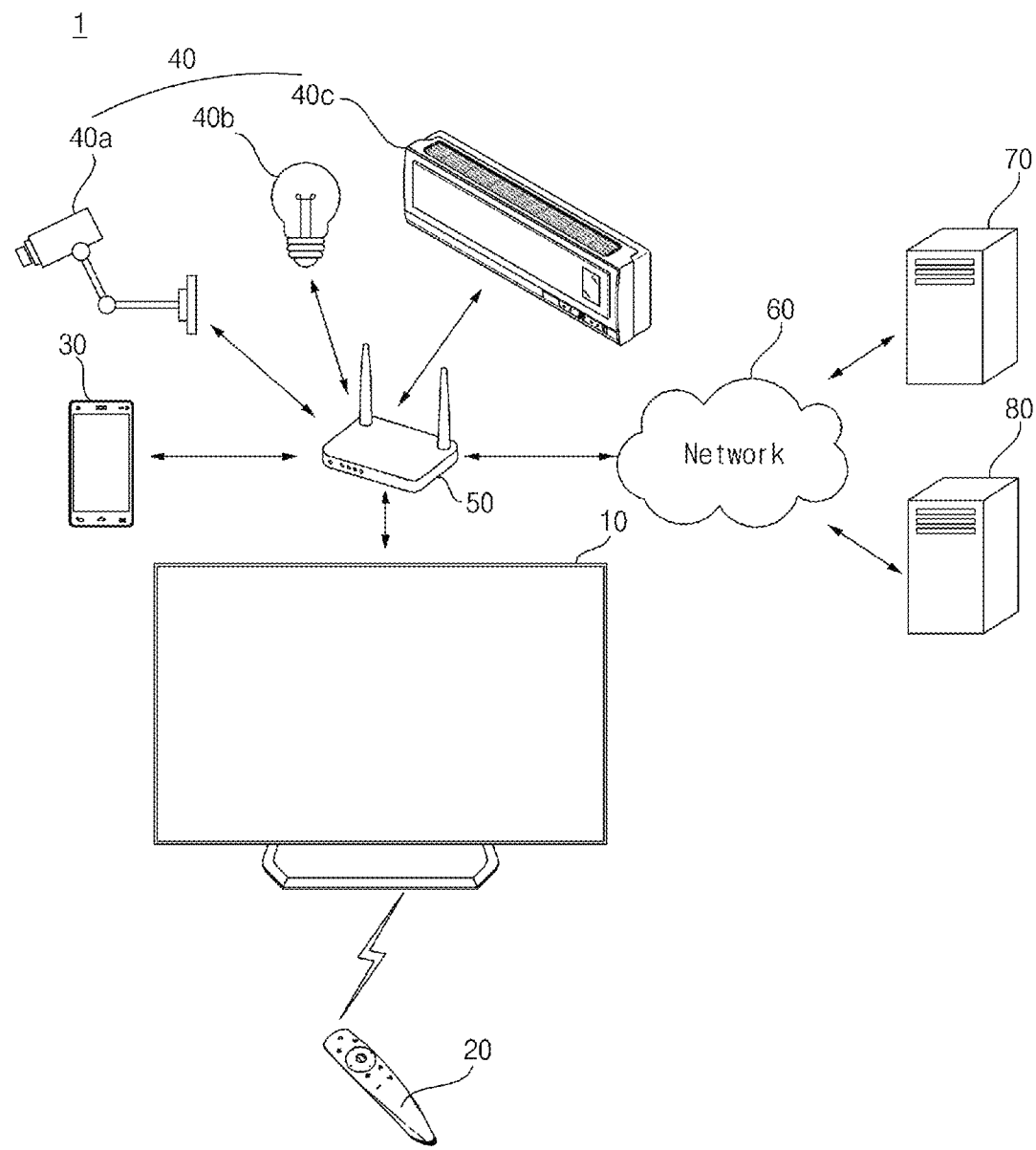
FIG. 1 is a diagram illustrating a system, according to an embodiment of the present disclosure.

FIG. 1 is a diagram illustrating a system according to various embodiments of the present disclosure.

Referring to FIG. 1, a system 1 may include an image display device 10, a remote control device 20, a first external device 30, a second external device 40, an access point AP 50, a first server 70 and/or a second server 80.

The image display device 10 may be a device that processes and outputs an image. The image display device 10 is not particularly limited as long as it can output a screen corresponding to an image signal, such as a TV, a notebook computer, and a monitor.

The image display device 10 may receive a broadcast signal, process it, and output a signal-processed broadcast image. When the image display device 10 receives a broadcast signal, the image display device 10 may correspond to a broadcast reception device.

The image display device 10 may receive a broadcast signal wirelessly through an antenna, or may receive a broadcast signal by wire through a cable.

For example, the image display device 10 may receive a terrestrial broadcast signal, a satellite broadcast signal, a cable broadcast signal, an Internet Protocol Television (IPTV) broadcast signal, and the like.

The remote control device 20 may be connected to the image display device 10 by wire and/or wirelessly to provide various control signals to the image display device 10. At this time, the remote control device 20 may include a device that establishes a wired or wireless network with the image display device 10 and transmits various control signals to the image display device 10 through the established network, or receives a signal related to various operations processed by the image display device 10 from the image display device 10.

For example, various input devices such as a mouse, a keyboard, a space remote controller, a trackball, and a joystick may be used as the remote control device 20.

The image display device 10 may connect to only a single remote control device 20, or simultaneously connect to two or more remote control devices 20, and may change an object displayed on a screen or adjust the state of a screen, based on a control signal provided from each remote control device 20.

Meanwhile, the remote control device 20 may access a local network provided by the access point 50, or may transmit/receive data by using short-distance communication.

The first external device 30 may be a device capable of receiving a user input and controlling an operation of the second external device 40 according to the received user input. For example, the first external device 30 may be a mobile terminal such as a smart phone, a notebook computer, personal digital assistants PDA, a portable multimedia player PMP, a wearable device, and the like.

The second external device 40 may include various home appliances. For example, the second external device 40 may include an interphone 40a, a lighting system 40b, and/or an air conditioner 40c, and may further include a robot cleaner, a washing machine, a refrigerator, and the like.

The image display device 10, the first external device 30, and/or the second external device 40 may transmit/receive data mutually by using a short-distance communication such as Wireless Fidelity (Wi-Fi), BLUETOOTH, BLUETOOTH LOW ENERGY (BLE), ZIGBEE, NEAR FIELD COMMUNICATION (NFC).

The access point 50 may be a network auxiliary device that communicates with various devices, and allows the devices approaching the access point 50 to transmit/receive data to and from each other through a local network, or to access an external network 60 such as the Internet. For example, the image display device 10, the first external device 30, and/or the second external device 40 may access a local network through the access point 50, and may mutually transmit and receive data through a local network. For example, the image display device 10 may access the Internet through the access point 50 to transmit/receive data to and from the server 70, 80.

Meanwhile, the image display device 10, the first external device 30, and/or the second external device 40 may access the external network 60 such as the Internet by using cellular communication using at least one of long-term evolution (LTE), LTE Advance (LTE-A), code division multiple) access (CDMA), wideband CDMA (WCDMA), universal mobile telecommunications system (UMTS), wireless broadband (WiBro), or Global System for Mobile Communications (GSM).

Meanwhile, the server 70, 80 may store data received from at least one of the image display device 10, the first external device 30, and the second external device 40, and process the data. For example, the first server 70 may be a server corresponding to the second external device 40, which is related to the operation control of the second external device 40, for example, a manufacturer server of the second external device 40, and the second server 80 may be a server corresponding to the image display device 10, which transmits and receives data to and from the image display device 10, for example, a manufacturer server of the image display device 10.

Figure 2:
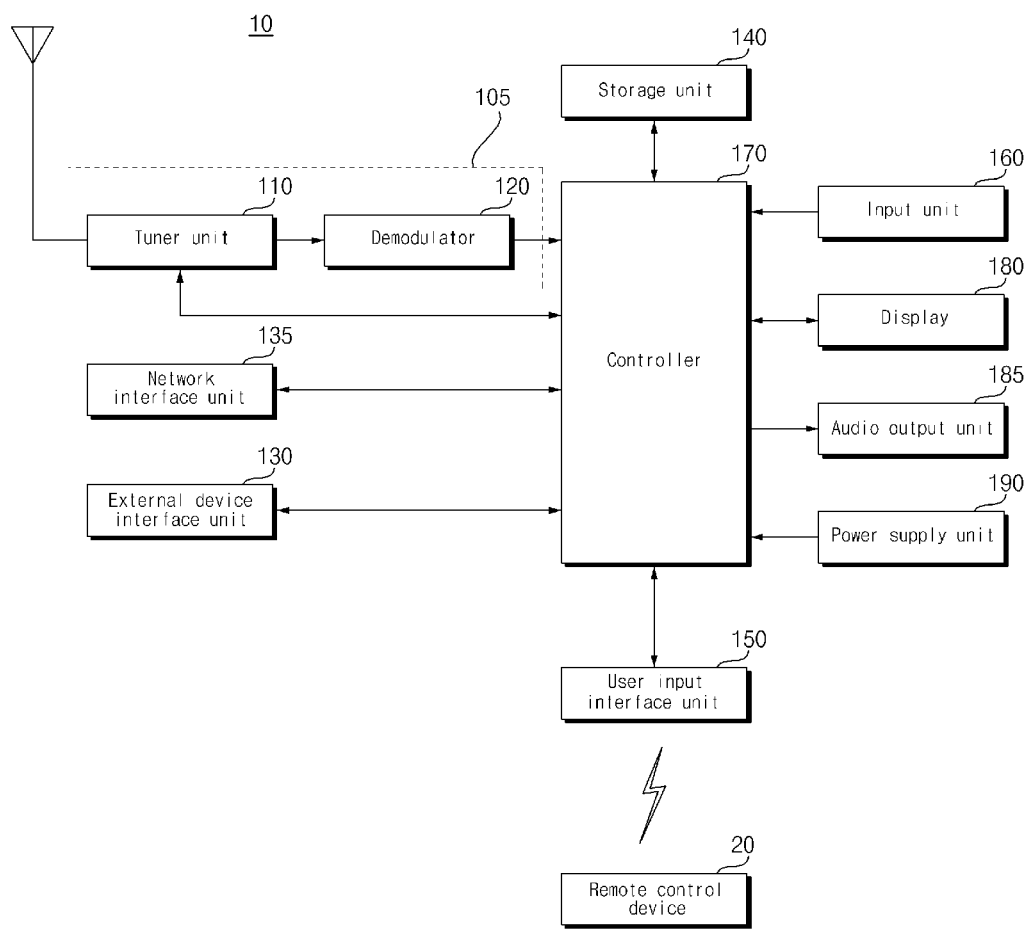
FIG. 2 is an internal block diagram of an image display device of FIG. 1.

FIG. 2 is an internal block diagram of the image display device of FIG. 1.

Referring to FIG. 2, the image display device 10 may include a broadcast reception unit 105, an external device interface unit 130, a network interface unit 135, a storage unit 140, a user input interface unit 150, an input unit 160, a controller 170, a display 180, an audio output unit 185, and/or a power supply unit 190.

The broadcast reception unit 105 may include a tuner unit 110 and a demodulator 120.

Meanwhile, unlike the drawing, the image display device 10 may include only the broadcast reception unit 105 and the external device interface unit 130, among the broadcast reception unit 105, the external device interface unit 130, and the network interface unit 135. That is, the image display device 10 may not include the network interface unit 135.

The tuner unit 110 may select a broadcast signal corresponding to a channel selected by a user or to all previously stored channels, among broadcast signals received through an antenna (not shown) or a cable (not shown). The tuner unit 110 may convert the selected broadcast signal into an intermediate frequency signal or a baseband image or voice signal.

For example, if the selected broadcast signal is a digital broadcast signal, the tuner unit 110 may convert the broadcast signal into a digital IF signal (DIF), and if the selected broadcast signal is an analog broadcast signal, may convert the broadcast signal into an analog baseband image or voice signal (CVBS/SIF). That is, the tuner unit 110 may process a digital broadcast signal or an analog broadcast signal. The analog baseband image or voice signal (CVBS/SIF) output from the tuner unit 110 may be directly input to the controller 170.

Meanwhile, the tuner unit 110 may sequentially select broadcast signals of all broadcast channels stored through a channel storage function among the received broadcast signals, and convert them into an intermediate frequency signal or a baseband image or voice signal.

Meanwhile, the tuner unit 110 may include a plurality of tuners in order to receive broadcast signals of a plurality of channels. Alternatively, a single tuner that simultaneously receives broadcast signals of a plurality of channels is also possible.

The demodulator 120 may receive a digital IF signal (DIF) converted by the tuner unit 110 and perform a demodulation operation.

The demodulator 120 may output a stream signal TS after performing a demodulation and a channel decoding. In this case, the stream signal may be a signal obtained by multiplexing an image signal, a voice signal, or a data signal.

The stream signal output from the demodulator 120 may be input to the controller 170. After performing demultiplexing and image/voice signal processing, the controller 170 may output an image through the display 180 and output a voice through the audio output unit 185.

The external device interface unit 130 may transmit or receive data with a connected external device. To this end, the external device interface unit 130 may include an A/V input/output unit (not shown).

The external device interface unit 130 may be connected to an external device such as Digital Versatile Disk (DVD), BLU-RAY, game device, camera, camcorder, computer (laptop), set-top box, by wire/wireless, and may perform an input/output operation with an external device.

In addition, the external device interface unit 130 may establish a communication network with various remote control devices 200 as shown in FIG. 1, and may receive a control signal related to the operation of the image display device 10 from the remote control device 20, or may transmit data related to the operation of the image display device 10 to the remote control device 20.

The A/V input/output unit may receive image and voice signals from an external device. For example, the A/V input/output unit may include an Ethernet terminal, a USB terminal, a Composite Video Banking Sync (CVBS) terminal, a component terminal, an S-video terminal (analog), a Digital Visual Interface (DVI) terminal, a High Definition Multimedia Interface (HDMI) terminal, a Mobile High-definition Link (MHL) terminal, an RGB terminal, a D-SUB terminal, an IEEE 1394 terminal, an SPDIF terminal, a Liquid HD terminal, and the like. A digital signal input through these terminals may be transmitted to the controller 170. In this case, the analog signal input through the CVBS terminal and the S-video terminal may be converted into a digital signal through an analog-to-digital converter (not shown) and transmitted to the controller 170.

The external device interface unit 130 may include a wireless communication unit (not shown) for short-range wireless communication with other electronic device. Through such a wireless communication unit, the external device interface unit 130 may exchange data with an adjacent device. For example, the external device interface unit 130 may receive device information, executed application information, an application image, and the like, from the first external device 30, in a mirroring mode.

The external device interface unit 130 may perform short-range wireless communication by using BLU-ETOOTH, Radio Frequency Identification (RFID), INFRA-RED DATA ASSOCIATION (IrDA), Ultra-Wideband (UWB), ZIGBEE, or the like.

The network interface unit 135 may provide an interface for connecting the image display device 10 to a wired/wireless network including an Internet network.

The network interface unit 135 may include a communication module (not shown) for connection to a wired/wireless network. For example, the network interface unit 135 may include a communication module for a Wireless LAN (WLAN) (Wi-Fi), a Wireless broadband (Wibro), a World Interoperability for Microwave Access (Wimax), a High Speed Downlink Packet Access (HSDPA), and the like.

The network interface unit 135 may transmit or receive data with other user or other electronic device through a connected network or other network linked to the connected network.

The network interface unit 135 may receive web contents or data provided by a contents provider or a network operator. That is, the network interface unit 135 may receive web contents such as movie, advertisement, game, VOD, and broadcast signal provided from a contents provider or a network provider through a network, and information related thereto.

The network interface unit 135 may receive firmware update information and an update file provided by a network operator, and may transmit data to Internet or contents provider or network operator.

The network interface unit 135 may select and receive a desired application from among applications open to the public, through a network.

The storage unit 140 may store a program for processing and controlling each signal inside the controller 170, or may store a signal-processed image, voice, or data signal.

For example, the storage unit 140 may store application programs designed for the purpose of performing various tasks that can be processed by the controller 170, and may selectively provide some of the stored application programs, upon request of the controller 170.

The program stored in the storage unit 140 is not particularly limited as long as it can be executed by the controller 170.

The storage unit 140 may serve to temporarily store an image, audio, or data signal received from an external device through the external device interface unit 130.

The storage unit 140 may store information related to a certain broadcast channel through a channel storage function such as a channel map.

FIG. 2 illustrates an embodiment in which the storage unit 140 is provided separately from the controller 170, but the scope of the present disclosure is not limited thereto, and the storage unit 140 may be included in the controller 170.

The storage unit 140 may include at least one of a volatile memory (e.g. DRAM, SRAM, SDRAM, etc.), and a non-volatile memory (e.g. a flash memory, a hard disk drive (HDD), a solid-state drive (SSD), etc.) In various embodiments of the present disclosure, the storage unit 140 and the memory may be used interchangeably.

The user input interface unit 150 may transmit a signal input by a user to the controller 170, or may transmit a signal from the controller 170 to a user.

For example, the user input interface unit 150 may transmit/receive a user input signal such as power on/off, channel selection, and screen setting from the remote control device 20, may transmit a user input signal input from a local key (not shown) such as a power key, a channel key, a volume key, and a set value to the controller 170, may transmit a user input signal input from a sensor unit (not shown) for sensing a user's gesture to the controller 170, or may transmit a signal from the controller 170 to the sensor unit.

The input unit 160 may be provided in one side of the main body of the image display device 10. For example, the input unit 160 may include a touch pad, a physical button, and the like.

The input unit 160 may receive various user commands related to the operation of the image display device 10, and may transmit a control signal corresponding to the input command to the controller 170.

The input unit 160 may include at least one microphone (not shown), and may receive a user's voice through the microphone.

The controller 170 may include at least one processor, and may control the overall operation of the image display device 10 by using the processor. Here, the processor may be a general processor such as a central processing unit (CPU). Obviously, the processor may be a dedicated device such as an ASIC or other hardware-based processor.

The controller 170 may generate and output a signal for image or voice output by demultiplexing a stream that is input through the tuner unit 110, the demodulator 120, the external device interface unit 130, or the network interface unit 135, or processing the demultiplexed signals.

The display 180 may convert an image signal, a data signal, an OSD signal, a control signal processed by the controller 170, or an image signal, a data signal, and a control signal received from the external device interface unit 130 to generate a driving signal.

The display 180 may include a display panel (not shown) including a plurality of pixels.

A plurality of pixels included in the display panel may include a RGB sub-pixel. Alternatively, the plurality of pixels included in the display panel may include a RGBW sub-pixel. The display 180 may generate a driving signal for a plurality of pixels by converting an image signal, a data signal, an OSD signal, a control signal, etc. processed by the controller 170.

The display 180 may be a plasma display panel (PDP), a liquid crystal display (LCD), an organic light emitting diode (OLED), a flexible display, and the like, and may be a three-dimensional (3D) display. The 3D display 180 may be divided into a non-glasses type and a glasses type.

Meanwhile, the display 180 may be configured as a touch screen and may be used as an input device in addition to an output device.

The audio output unit 185 may receive a voice-processed signal from the controller 170 and output it as voice.

The image signal processed by the controller 170 may be input to the display 180 and displayed as an image corresponding to a relevant image signal. In addition, the image signal processed by the controller 170 may be input to an external output device through the external device interface unit 130.

The voice signal processed by the controller 170 may be outputted as voice to the audio output unit 185. In addition, the voice signal processed by the controller 170 may be input to an external output device through the external device interface unit 130.

Although not shown in FIG. 2, the controller 170 may include a demultiplexer, an image processor, and the like. This will be described later with reference to FIG. 3.

In addition, the controller 170 may control overall operations in the image display device 10. For example, the controller 170 may control the tuner unit 110 to tune a channel selected by a user or a broadcast corresponding to a pre-stored channel.

In addition, the controller 170 may control the image display device 10 according to a user command input through the user input interface unit 150 or an internal program.

Meanwhile, the controller 170 may control the display 180 to display an image. In this case, the image displayed on the display 180 may be a still image or a moving image, and may be a 2D image or a 3D image.

Meanwhile, the controller 170 may enable to display a certain 2D object, in the image displayed on the display 180.

For example, the object may be at least one of an accessed web screen (newspaper, magazine, etc.), an electronic program guide (EPG), various menus, widget, icon, still image, moving image, and text.

Meanwhile, the image display device 10 may further include a photographing unit (not shown). The photographing unit may photograph a user. The photographing unit may be implemented with one camera, but is not limited thereto, and may be implemented with a plurality of cameras. Meanwhile, the photographing unit may be embedded in the image display device 10 in an upper portion of the display 180 or disposed separately. Image information photographed by the photographing unit may be input to the controller 170.

The controller 170 may recognize the location of a user, based on the image photographed by the photographing unit. For example, the controller 170 may determine a distance (z-axis coordinate) between a user and the image display device 10. In addition, the controller 170 may determine the x-axis coordinates and the y-axis coordinates in the display 180 corresponding to the user's location.

The controller 170 may detect a user's gesture based on each or a combination of an image photographed by the photographing unit or a signal detected from the sensor unit.

The power supply unit 190 may supply a corresponding power throughout the image display device 10. In particular, it may supply power to the controller 170 that can be implemented in the form of a system on chip (SOC), the display 180 for displaying an image, and the audio output unit 185 for outputting audio.

Specifically, the power supply unit 190 may include a converter (not shown) that converts AC power into DC power, and a DC/DC converter (not shown) that converts the level of DC power.

The remote control device 20 may transmit a user input to the user input interface unit 150. To this end, the remote control device 20 may use BLUETOOTH, Radio Frequency (RF) communication, Infrared Radiation communication, Ultra-wideband (UWB), ZIGBEE method, etc. In addition, the remote control device 20 may receive an image, voice, or data signal output from the user input interface unit 150, and display it by the remote control device 20 or output it as voice.

Meanwhile, the above-described image display device 10 may be a digital broadcasting receiver capable of receiving a fixed or mobile digital broadcasting.

Meanwhile, the block diagram of the image display device 10 shown in FIG. 2 is just only a block diagram for an embodiment of the present disclosure, and each component of the block diagram may be integrated, added, or omitted according to the specification of the image display device 10 that is actually implemented.

That is, two or more components may be combined into one component, or one component may be subdivided into two or more components as needed. In addition, the function performed in each block is for explaining the embodiment of the present disclosure, and the specific operation or device does not limit the scope of the present disclosure.

Figure 3:
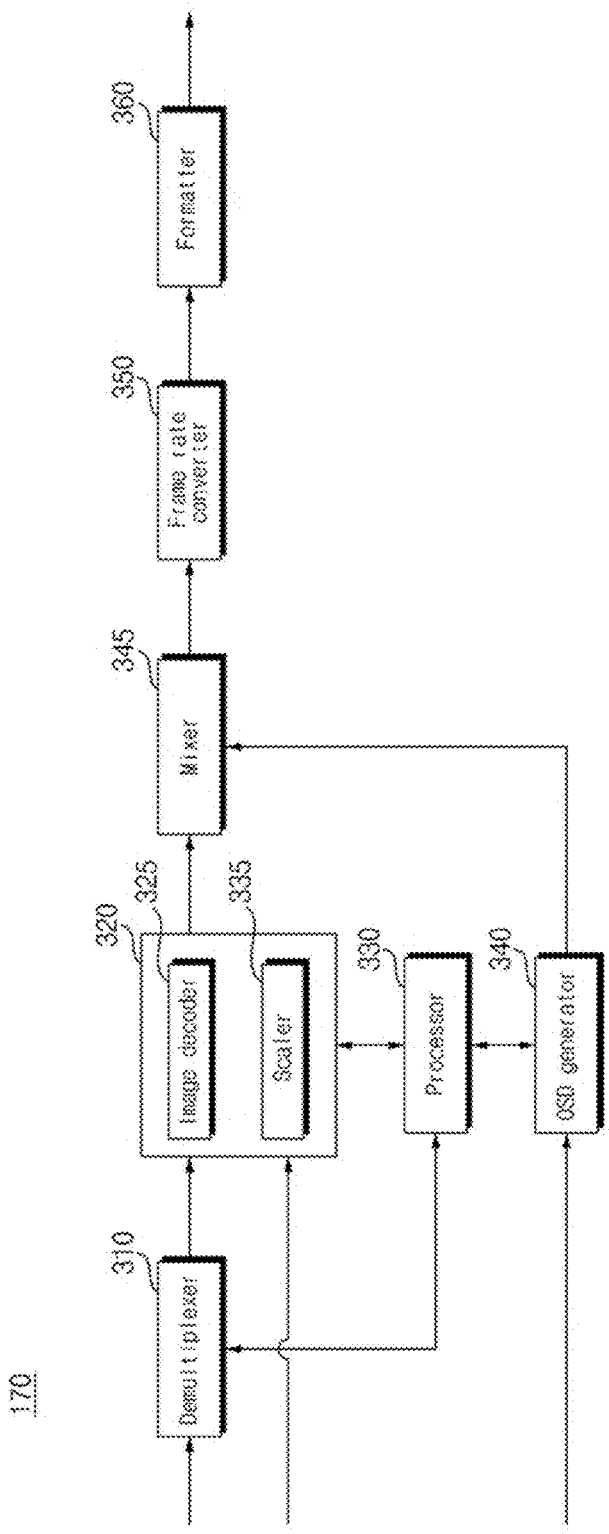
FIG. 3 is an internal block diagram of a controller of FIG. 2.

FIG. 3 is an internal block diagram of the controller of FIG. 2.

Referring to FIG. 3, the controller 170 according to an embodiment of the present disclosure may include a demultiplexer 310, an image processor 320, a processor 330, an OSD generator 340, a mixer 345, a frame rate converter 350, and/or a formatter 360. In addition, it may further include an audio processing unit (not shown) and a data processing unit (not shown).

The demultiplexer 310 may demultiplex an input stream. For example, when MPEG-2 TS is input, it can be demultiplexed and separated into image, voice, and data signals, respectively. Here, the stream signal input to the demultiplexer 310 may be a stream signal output from the tuner unit 110, the demodulator 120, or the external device interface unit 130.

The image processing unit 320 may perform image processing of the demultiplexed image signal. To this end, the image processing unit 320 may include an image decoder 325 and a scaler 335.

The image decoder 325 may decode the demultiplexed image signal, and the scaler 335 may perform scaling to output the resolution of the decoded image signal on the display 180.

The image decoder 325 may include a decoder of various standards. For example, it may include an MPEG-2, H, 264 decoder, a 3D image decoder for a color image and a depth image, a decoder for a multi-view image, and the like.

The processor 330 may control overall operation in the image display device 10 or the controller 170. For example, the processor 330 may control the tuner unit 110 to tune a channel selected by a user or a broadcast corresponding to a pre-stored channel.

In addition, the processor 330 may control the image display device 10 according to a user command input through the user input interface unit 150 or an internal program.

In addition, the processor 330 may perform data transmission control with the network interface unit 135 or the external device interface unit 130.

In addition, the processor 330 may control operations of the demultiplexer 310, the image processor 320, the OSD generator 340, and the like in the controller 170.

The OSD generator 340 may generate an OSD signal according to a user input or by itself. For example, it may generate a signal for displaying various types of information as graphic or text on a screen of the display 180, based on a user input signal input through the input unit 160.

The generated OSD signal may include various data such as a user interface screen, various menu screens, a widget, and an icon of the image display device 10. In addition, the generated OSD signal may include a 2D object or a 3D object.

In addition, the OSD generator 340 may generate a pointer that can be displayed on the display 180, based on a pointing signal input from the remote control device 20. The OSD generator 340 may include a pointing signal processor (not shown) that generates a pointer. A pointing signal processing unit (not shown) may be provided separately instead of being provided in an OSD generating unit 240.

The mixer 345 may mix the OSD signal generated by the OSD generator 340 and the decoded image signal image-processed by the image processor 320. The mixed image signal may be provided to the frame rate converter 350.

The frame rate converter (FRC) 350 may convert a frame rate of an input image. Meanwhile, the frame rate converter 350 may output intactly without a separate frame rate conversion.

The formatter 360 may arrange a left-eye image frame and a right-eye image frame of the frame rate-converted 3D image. In addition, it may output a synchronization signal Vsync for opening the left eye glass and the right eye glass of a 3D viewing device (not shown).

Meanwhile, the formatter 360 may change the format of the input image signal into an image signal to be displayed on the display 180, and output it.

In addition, the formatter 360 may change the format of the 3D image signal. For example, it may change into any one format among various 3D formats such as a Side by Side format, a Top/Down format, a Frame Sequential format, an Interlaced format, a Checker Box format.

Meanwhile, the formatter 360 may convert a 2D image signal into a 3D image signal. For example, according to the 3D image generation algorithm, an edge or a selectable object is detected in the 2D image signal, and an object according to the detected edge or a selectable object may be separated into a 3D image signal to generate. In this case, as described above, the generated 3D image signal may be separated into a left-eye image signal L and a right-eye image signal R and arranged.

Meanwhile, although not shown in the drawing, a 3D processor (not shown) for processing a 3-dimensional effect signal may be further disposed, after the formatter 360. Such a 3D processor may process the brightness, tint, and color adjustments of an image signal in order to improve a 3D effect. For example, a signal processing that makes a near field clear and a far distance blurry may be performed. Meanwhile, the function of the 3D processor may be merged into the formatter 360 or integrated into the image processing unit 320.

Meanwhile, an audio processing unit (not shown) in the controller 170 may perform audio processing of the demultiplexed voice signal. To this end, the audio processing unit (not shown) may include various decoders.

In addition, the audio processing unit (not shown) in the controller 170 may process a base, a treble, volume control, and the like.

A data processing unit (not shown) in the controller 170 may perform data processing of the demultiplexed data signal. For example, when the demultiplexed data signal is an encoded data signal, it can be decoded. The encoded data signal may be electronic program guide information including broadcast information such as start time and end time of a broadcast program aired on each channel.

Meanwhile, the block diagram of the controller 170 shown in FIG. 3 is just only a block diagram for an embodiment of the present disclosure, and each component of the block diagram may be integrated, added, or omitted according to the specification of the controller 170 that is actually implemented.

In particular, the frame rate converter 350 and the formatter 360 may not be provided in the controller 170, but may be separately provided respectively, or provided separately as one module.

Figure 4A:
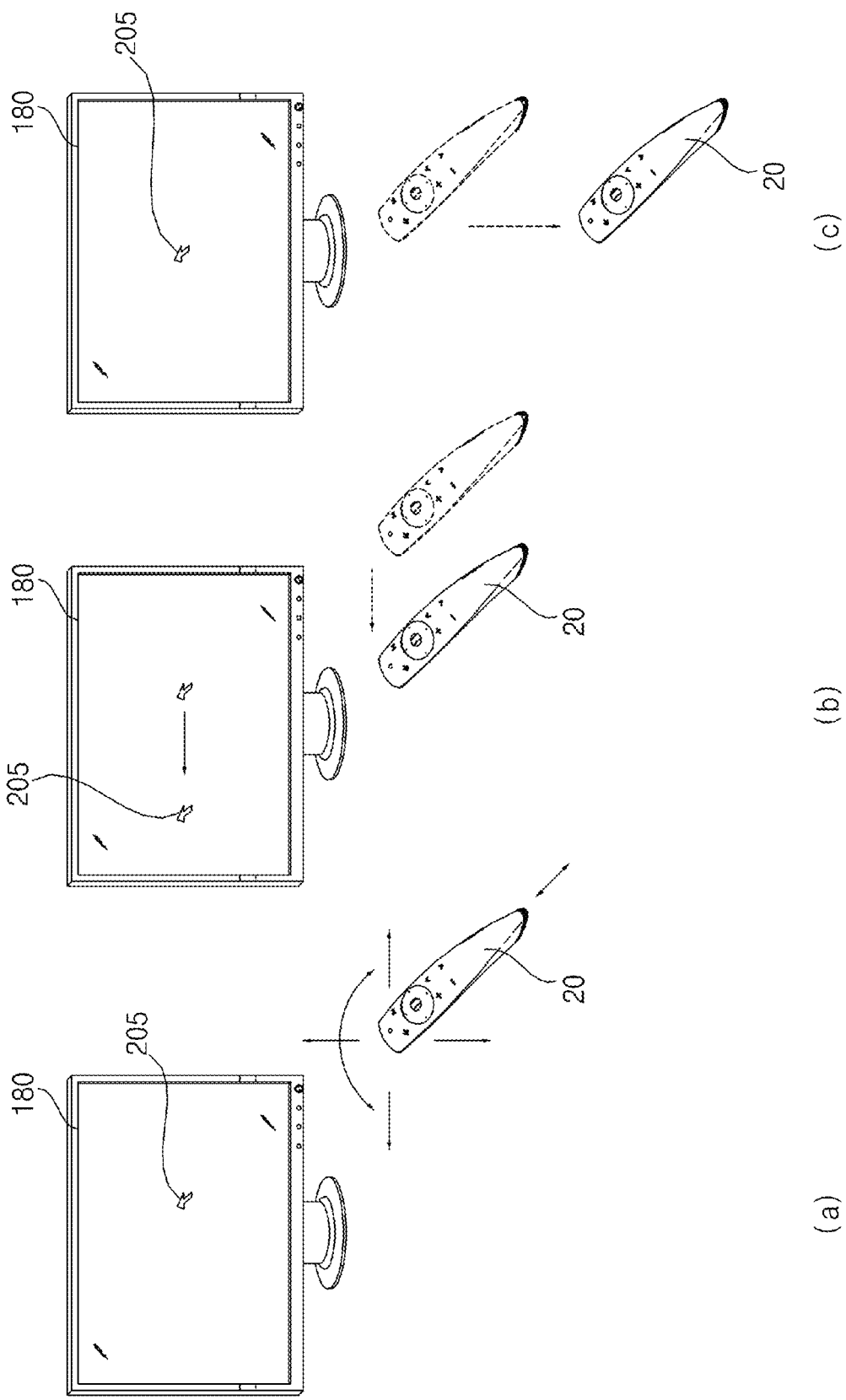
FIG. 4A is a diagram illustrating a control method of a remote control device of FIG. 2.
Figure 4B:
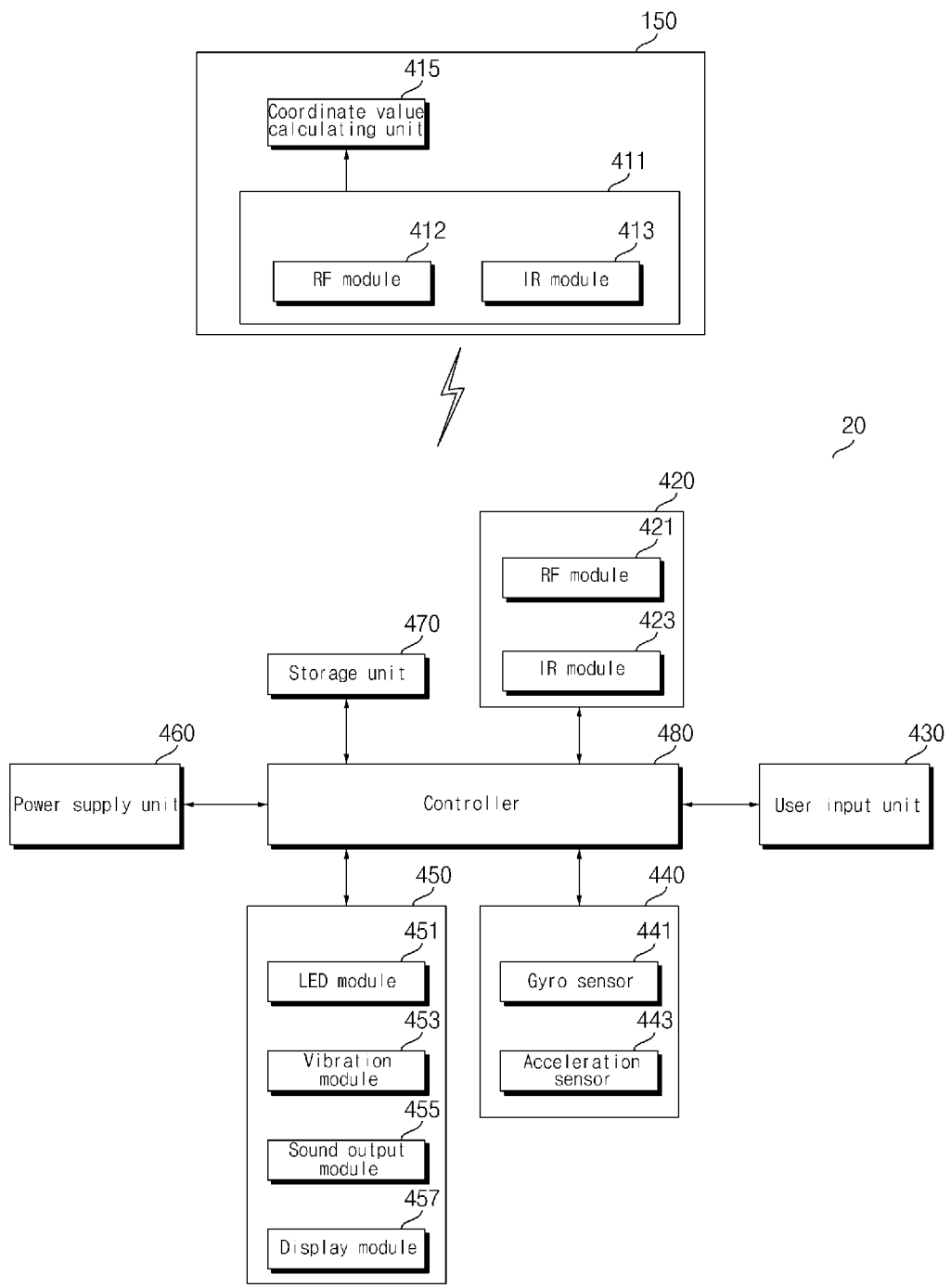
FIG. 4B is an internal block diagram of the remote control device of FIG. 2.

FIG. 4A is a diagram illustrating a control method of the remote control device of FIG. 2, and FIG. 4B is an internal block diagram of the remote control device of FIG. 2.

Referring to FIG. 4A, it can be seen that the pointer 205 corresponding to the remote control device 20 is displayed on the display 180 of the image display device 10.

Referring to FIG. 4A(a), a user may move or rotate the remote control device 20 up, down, left and right, back and forth. In this case, the pointer 205 displayed on the display 180 of the image display device 10 may be displayed in response to the movement of the remote control device 20. As shown in FIG. 4A, the remote control device 20 may be called a space remote controller or a 3D pointing device, because a corresponding pointer 205 is moved and displayed according to movement in 3D space.

Referring to FIG. 4A(b), when a user moves the remote control device 20 to the left, it can be seen that the pointer 205 displayed on the display 180 of the image display device 10 also moves to the left in response to the movement of the remote control device 20.

Information related to the movement of the remote control device 20 detected through a sensor of the remote control device 20 may be transmitted to the image display device 10. The image display device 10 may calculate the coordinates of the pointer 205 from the information related to the movement of the remote control device 20. The image display device 10 may display the pointer 205 to correspond to the calculated coordinates.

Referring to FIG. 4A(c), in a state of pressing a specific button provided on the remote control device 20, a user may move the remote control device 20 away from the display 180. Accordingly, a selection area in the display 180 corresponding to the pointer 205 may be zoomed-in and displayed in an enlarged manner. On the contrary, when a user moves the remote control device 20 closer to the display 180 in a state of pressing a specific button provided in the remote control device 20, the display 180 corresponding to the pointer 205, a selection area in the display 180 corresponding to the pointer 205 may be zoomed-out and displayed in a reduced manner.

Meanwhile, when the remote control device 20 moves away from the display 180, the selection area may be zoomed-out, and when the remote control device 20 approaches the display 180, the selection area may be zoomed-in.

Meanwhile, in a state in which a user presses a specific button in the remote control device 20, recognition of vertical and horizontal movements may be excluded. That is, when the remote control device 20 moves away from or close to the display 180, the up, down, left, and right movements are not recognized, but only forward and backward movements may be recognized. In a state in which a user does not press a specific button in the remote control device 20, only up, down, left, and right movements of the remote control device 20 can be recognized, and accordingly, only the pointer 205 can be moved.

Meanwhile, the moving speed or moving direction of the pointer 205 may correspond to the moving speed or moving direction of the remote control device 20.

Referring to FIG. 4B, the remote control device 20 may include a wireless communication unit 420, a user input unit 430, a sensor unit 440, an output unit 450, a power supply unit 460, a storage unit 470, and/or a controller 480.

The wireless communication unit 420 may transmit and receive a signal to and from the image display device 10.

In this embodiment, the remote control device 20 may include an RF module 421 capable of transmitting and receiving a signal to and from the image display device 10 according to a radio frequency (RF) communication standard. In addition, the remote control device 20 may include an IR module 423 capable of transmitting and receiving a signal to and from the image display device 10 according to an infrared radiation (IR) communication standard.

Meanwhile, the remote control device 20 may include at least one communication module for short-range wireless communication. For example, the remote control device 20 may include a communication module for a Near Field Communication (NFC).

The remote control device 20 may transmit a signal including information related to the movement of the remote control device 20 to the image display device 10 through the RF module 421. The remote control device 20 may receive a signal transmitted by the image display device 10 through the RF module 421.

The remote control device 20 may transmit a command related to power on/off, channel change, volume change, etc. to the image display device 10 through the IR module 423.

The user input unit 430 may include a keypad, a button, a touch pad, a touch screen, etc. The user may input a command related to the image display device 10 to the remote control device 20 by handling the user input unit 430.

When the user input unit 430 includes a hard key button, a user may input a command related to the image display device 10 to the remote control device 20 through a push operation of the hard key button.

When the user input unit 430 includes a touch screen, a user may input a command related to the image display device 10 to the remote control device 20 by touching a soft key of the touch screen.

Meanwhile, the user input unit 430 may include various types of input means that a user can operate, such as a scroll key or a jog key, and this embodiment does not limit the scope of the present disclosure.

The sensor unit 440 may include a gyro sensor 441 or an acceleration sensor 443. The gyro sensor 441 may sense a motion of the remote control device 20.

The gyro sensor 441 may sense information related to the operation of the remote control device 20 based on x, y, and z axes. The acceleration sensor 443 may sense information related to the moving speed of the remote control device 20. Meanwhile, the sensor unit 440 may further include a distance measuring sensor capable of sensing a distance to the display 180.

The output unit 450 may output an image or voice signal corresponding to a handling of the user input unit 430 or a signal transmitted from the image display device 10. Through the output unit 450, a user may recognize the handling of the user input unit 430 or the handling of the image display device 10.

The output unit 450 may include a LED module 451 that is turned on when the user input unit 430 is handled or a signal is transmitted and received with the image display device 10 through the wireless communication unit 420, a vibration module 453 that generates a vibration, a sound output module 455 that outputs a sound, and/or a display module 457 that outputs an image.

The power supply unit 460 may supply power to each component provided in the remote control device 20. The power supply unit 460 stops the supply of power when the remote control device 20 does not move for a certain time, thereby reducing power wastage. The power supply unit 460 may resume the supply of power when a certain key provided in the remote control device 20 is operated.

The storage unit 470 may store various types of programs and application data required for control or operation of the remote control device 20.

When the remote control device 20 wirelessly transmits/receives a signal through the image display device 10 and the RF module 421, the remote control device 20 and the image display device 10 may transmit/receive signals through a certain frequency band. The controller 480 of the remote control device 20 may store information related to a frequency band for wirelessly transmitting and receiving signals to and from the image display device 10 paired with the remote control device 20 in the storage unit 470, and refer to the stored information.

The storage unit 470 may store device information (e.g. an identifier, a serial number, a model number, manufacturer information, a medium access control (MAC) address, etc.) of the image display device 10. For example, the remote control device 20 may transmit the device information of the image display device 10 to a nearby device by using a NFC function.

The controller 480 may include at least one processor, and may control overall operations of the remote control device 20 by using the processor included therein.

The controller 480 may transmit a signal corresponding to a certain key operation of the user input unit 430 or a signal corresponding to the movement of the remote control device 20 sensed by the sensor unit 440 to the image display device 10 through the wireless communication unit 420.

The user input interface unit 150 of the image display device 10 may include a wireless communication unit 151 capable of wirelessly transmitting and receiving signals with the remote control device 20, and a coordinate value calculating unit 415 capable of calculating a coordinate value of a pointer corresponding to an operation of the remote control device 20.

The user input interface unit 150 may wirelessly transmit/receive a signal to and from the remote control device 20 through a RF module 412. In addition, it may receive a signal transmitted by the remote control device 20 according to the IR communication standard through an IR module 413.

The coordinate value calculating unit 415 may calculate a coordinate value (x, y) of the pointer 205 to be displayed on the display 170 by correcting the hand shake or error, from a signal corresponding to the operation of the remote control device 20 received through the wireless communication unit 151.

The transmission signal of remote control device 20 input to the image display device 10 through the user input interface unit 150 may be transmitted to the controller 180 of the image display device 10. The controller 180 of the image display device 10 may determine information related to the operation and key handling of the remote control device 20 from the signal transmitted from the remote control device 20, and in response, may control the image display device 10.

As another example, the remote control device 20 may calculate a pointer coordinate value corresponding to the operation and output it to the user input interface unit 150 of the image display device 10. In this case, the user input interface 150 of the image display device 10 may transmit information related to the received pointer coordinate value to the controller 180 without a separate hand shake or error correction process.

In addition, as another example, unlike the drawing, the coordinate value calculating unit 415 may be provided inside the controller 170 instead of the user input interface unit 150.

Figure 5:
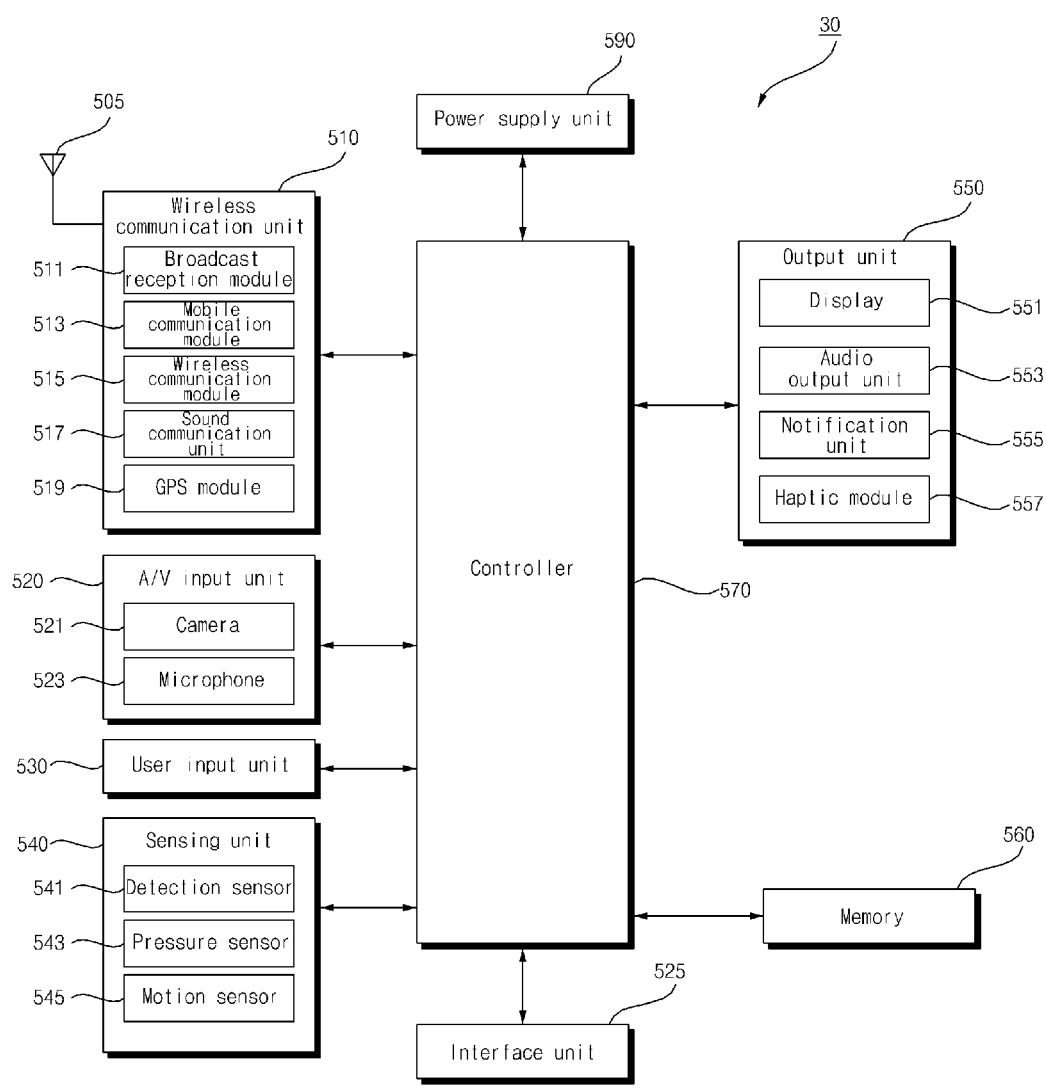
FIG. 5 is an internal block diagram of a first external device of FIG. 1.

FIG. 5 is an internal block diagram of the first external device of FIG. 1.

Referring to FIG. 5, the first external device 30 may include a wireless communication unit 510, an audio/video (A/V) input unit 520, a user input unit 530, a sensing unit 540, an output unit 550, a memory 560, an interface unit 525, a controller 570, and/or a power supply unit 590.

Meanwhile, the wireless communication unit 510 may include a broadcast reception module 511, a mobile communication module 513, a wireless communication module 515, a sound communication unit 517, a GPS module 519, and the like.

The broadcast reception module 511 may receive a broadcast signal from an external broadcast management server through a broadcast channel. In this case, the broadcast channel may include a satellite channel, a terrestrial channel, and the like.

Broadcast data received through broadcast reception module 511 may be stored in the memory 560.

The mobile communication module 513 may transmit/receive a wireless signal to/from at least one of a base station, an external terminal, and a server on a mobile communication network. Here, the wireless signal may include a voice call signal, a video call signal, or various types of data according to text/multimedia message transmission/reception.

The wireless communication module 515 may mean a module for wireless Internet access, and the wireless communication module 515 may be built-in or external to the first external device 30. For example, the wireless communication module 515 may perform a Wi-Fi-based wireless communication or a Wi-Fi Direct-based wireless communication.

In addition, BLUETOOTH, Radio Frequency Identification (RFID), INFRARED DATA ASSOCIATION (IrDA), Ultra-Wideband (UWB), ZIGBEE, etc. may be used as a short-range communication technology.

The sound communication unit 517 may perform sound communication. The sound communication unit 517 may add certain data to a sound to be output in the sound communication mode in the sound communication mode and output the sound. In addition, the sound communication unit 517 may extract certain data from sound received from the outside in the sound communication mode.

The Global Position System (GPS) module 519 may receive location information from a plurality of GPS satellites.

The A/V (Audio/Video) input unit 520 is for inputting an audio signal and/or a video signal, and may include a camera 521, a microphone 523, and the like.

The user input unit 530 may generate key input data input by a user to control the operation of the terminal. To this end, the user input unit 530 may include a key pad, a dome switch, a touch pad (resistive/capacitive), and the like. In particular, when the touch pad forms a layer structure with a display 551, it may be referred to as a touch screen.

The sensing unit 540 may generate a sensing signal for controlling the operation of the first external device 30 by detecting the current state of the first external device 30, such as the opening/closing state of the first external device 30, the location of the first external device 30, the contact of a user.

The sensing unit 540 may include a detection sensor 541, a pressure sensor 543, a motion sensor 545, and the like. The motion sensor 545 may detect the motion or location of the first external device 30 by using an acceleration sensor, a gyro sensor, a gravity sensor, or the like. In particular, the gyro sensor is a sensor for measuring angular velocity, and may detect a direction (angle) that is turned with respect to a reference direction.

The output unit 550 may include a display 551, an audio output unit 553, a notification unit 555, and a haptic module 557.

The display 551 may display and output a signal processed by the first external device 30.

Meanwhile, as described above, when the display 551 and the touchpad form a mutual layer structure and are configured as a touch screen, the display 551 may also be used as an input device capable of inputting information by a user's touch in addition to an output device.

The audio output unit 553 may output audio data received from the wireless communication unit 510 or stored in the memory 560. The audio output unit 553 may include a speaker, a buzzer, and the like.

The notification unit 555 may output a signal for notifying the occurrence of an event of the first external device 30. For example, the signal may be output in the form of vibration.

The haptic module 557 generates various tactile effects that a user can feel. A representative example of the tactile effect generated by the haptic module 557 is a vibration effect. The memory 560 may store a program for processing and controlling the controller 570, and may perform a function for temporary storage of input or output data (e.g. phonebook, message, still image, moving image, etc.).

The interface unit 525 serves as an interface with all external devices connected to the first external device 30. The interface unit 525 may receive data or receive power from the external device and transmit it to each component inside the first external device 30, and enable data inside the first external device 30 to be transmitted to the external device.

The controller 570 generally controls the operation of each component included in the first external device 30 to control the overall operation of the first external device 30. For example, it may perform the relevant control and processing for voice call, data communication, video call, and the like. In addition, the controller 570 may include a multimedia playback module 481 for multimedia playback. The multimedia playback module 481 may be configured as hardware inside the controller 570, or may be configured as software separately from the controller 570.

The power supply unit 590 receives external power and internal power under the control of the controller 570 to supply power required for operation of each component.

Meanwhile, a block diagram of the first external device 30 shown in FIG. 4 is a block diagram for an embodiment of the present disclosure. Each component of the block diagram may be integrated, added, or omitted according to the specification of the first external device 30 that is actually implemented. That is, two or more components may be combined into a single component, or a single component may be subdivided into two or more components as needed. In addition, the function performed in each block is for explaining an embodiment of the present disclosure, and the specific operation or device does not limit the scope of the present disclosure.

Meanwhile, the second external device 40 may include all or part of the components included in the first external device 30. In addition, all or part of the operations performed in the first external device 30 may be executed in the second external device 40.

Figure 6A:
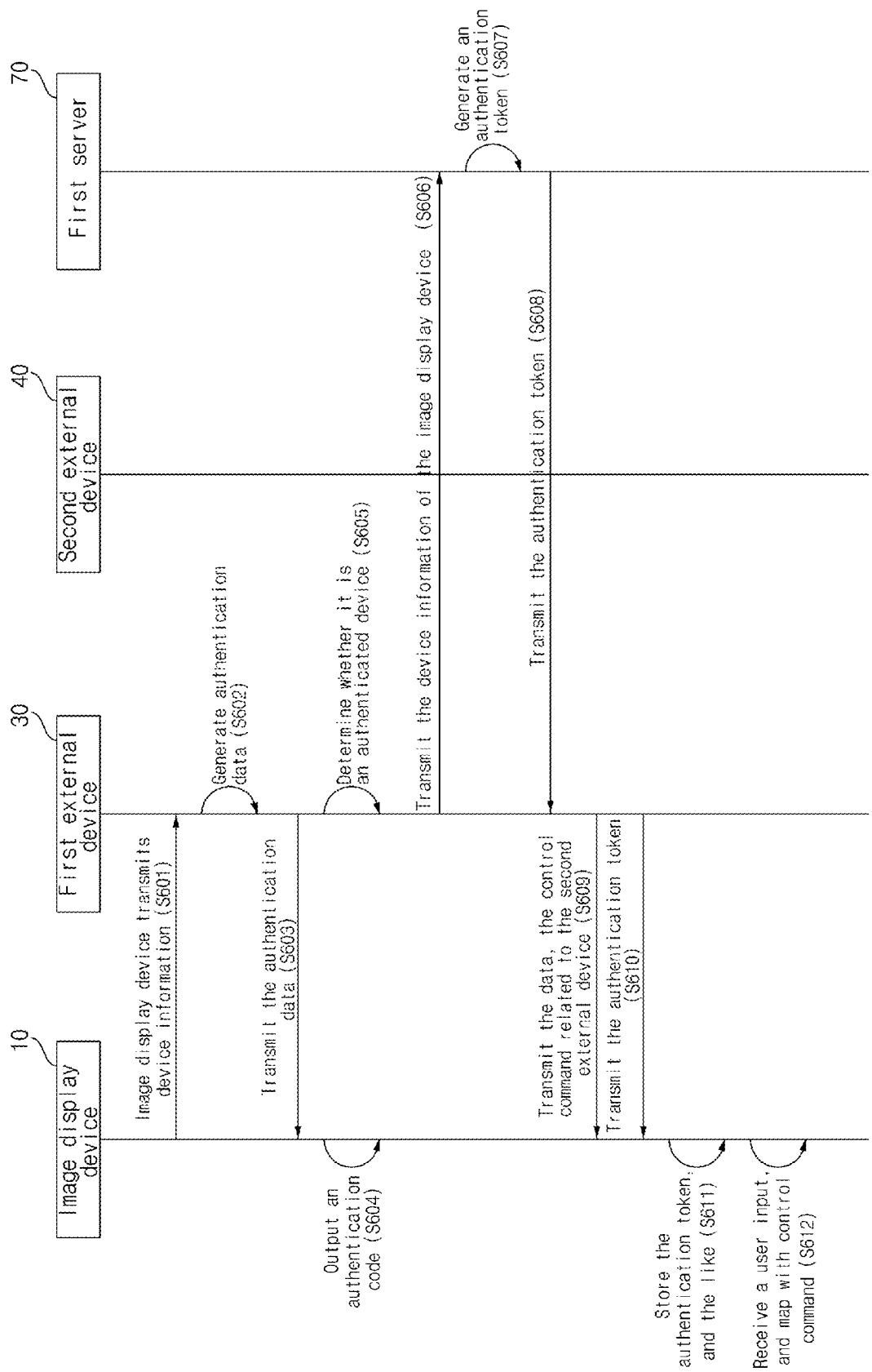
FIGS. 6A to 7 are flowcharts of an operation method of a system according to an embodiment of the present disclosure.
Figure 6B:
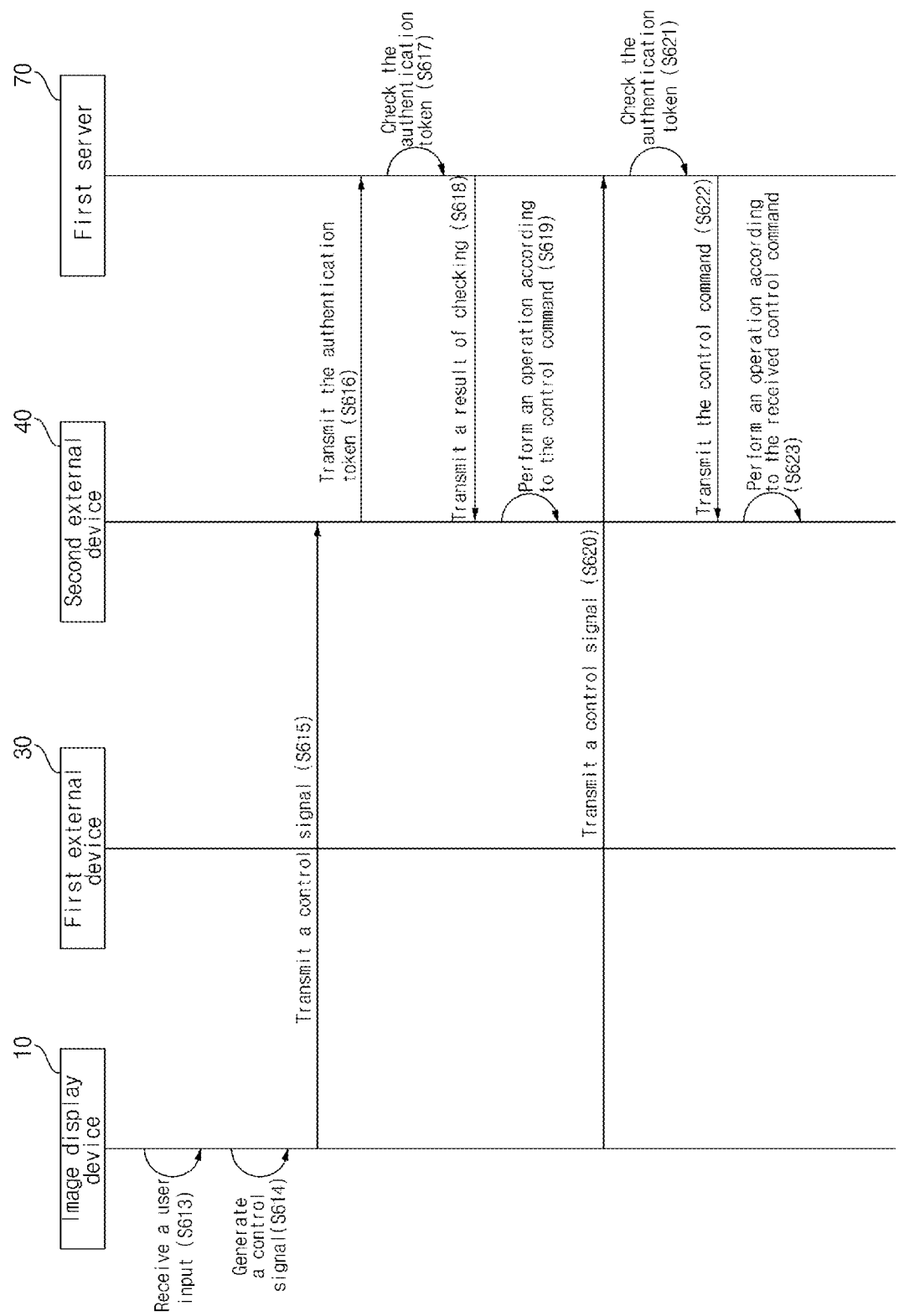
Figure 7:
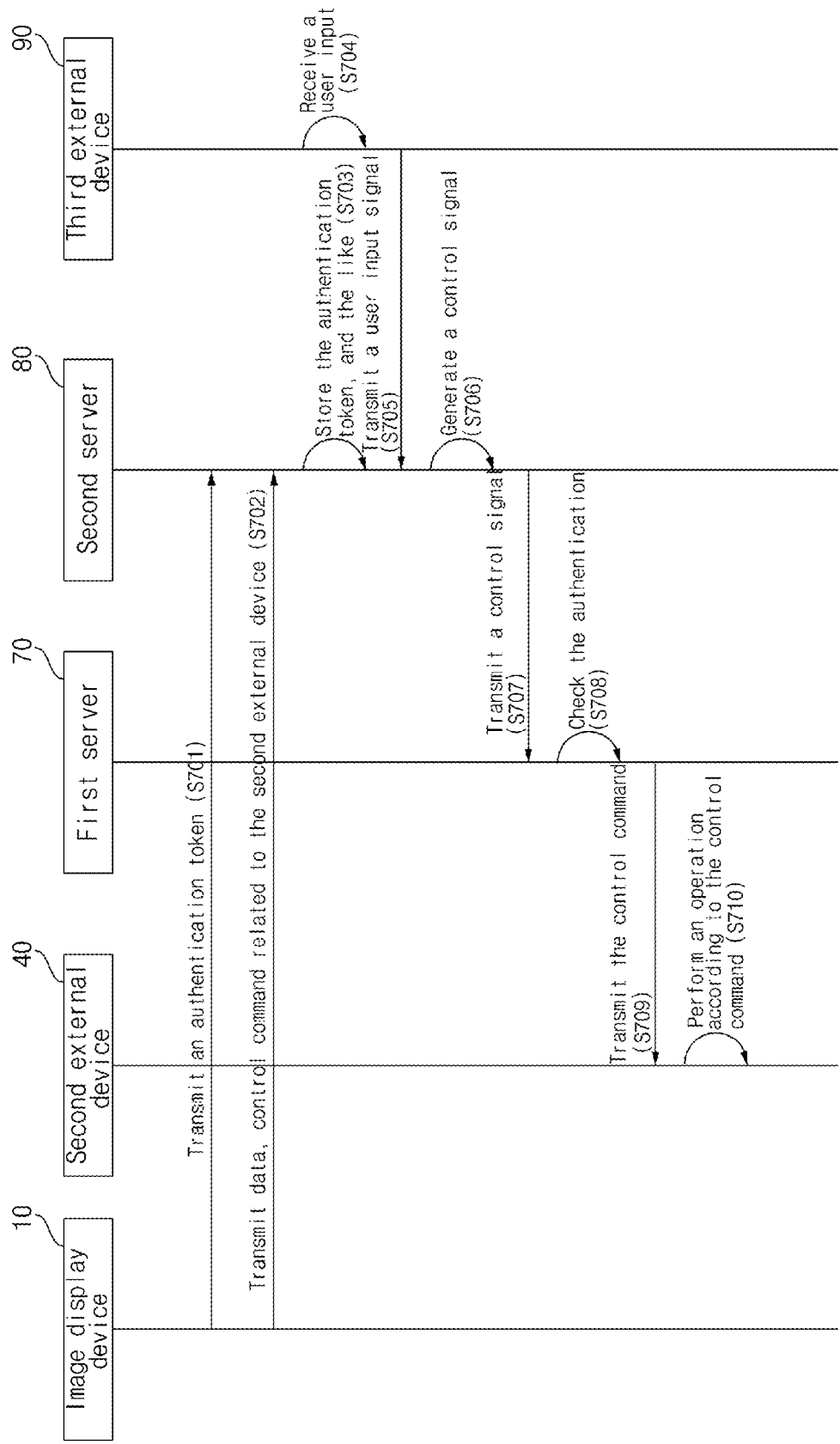
Figure 8:
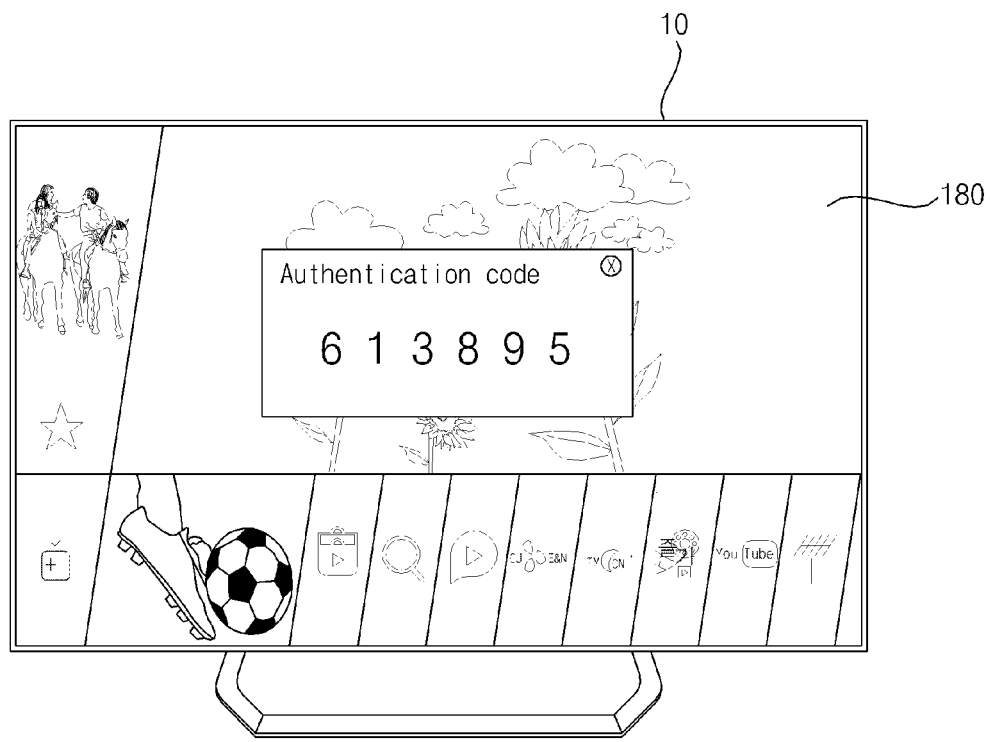
FIGS. 8 to 10 are diagrams for explaining the operation method of a system.
Figure 8:
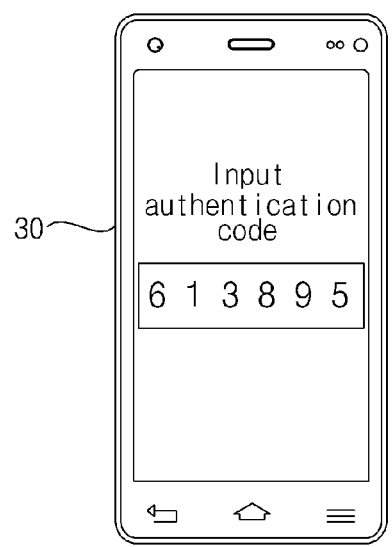
Figure 9:
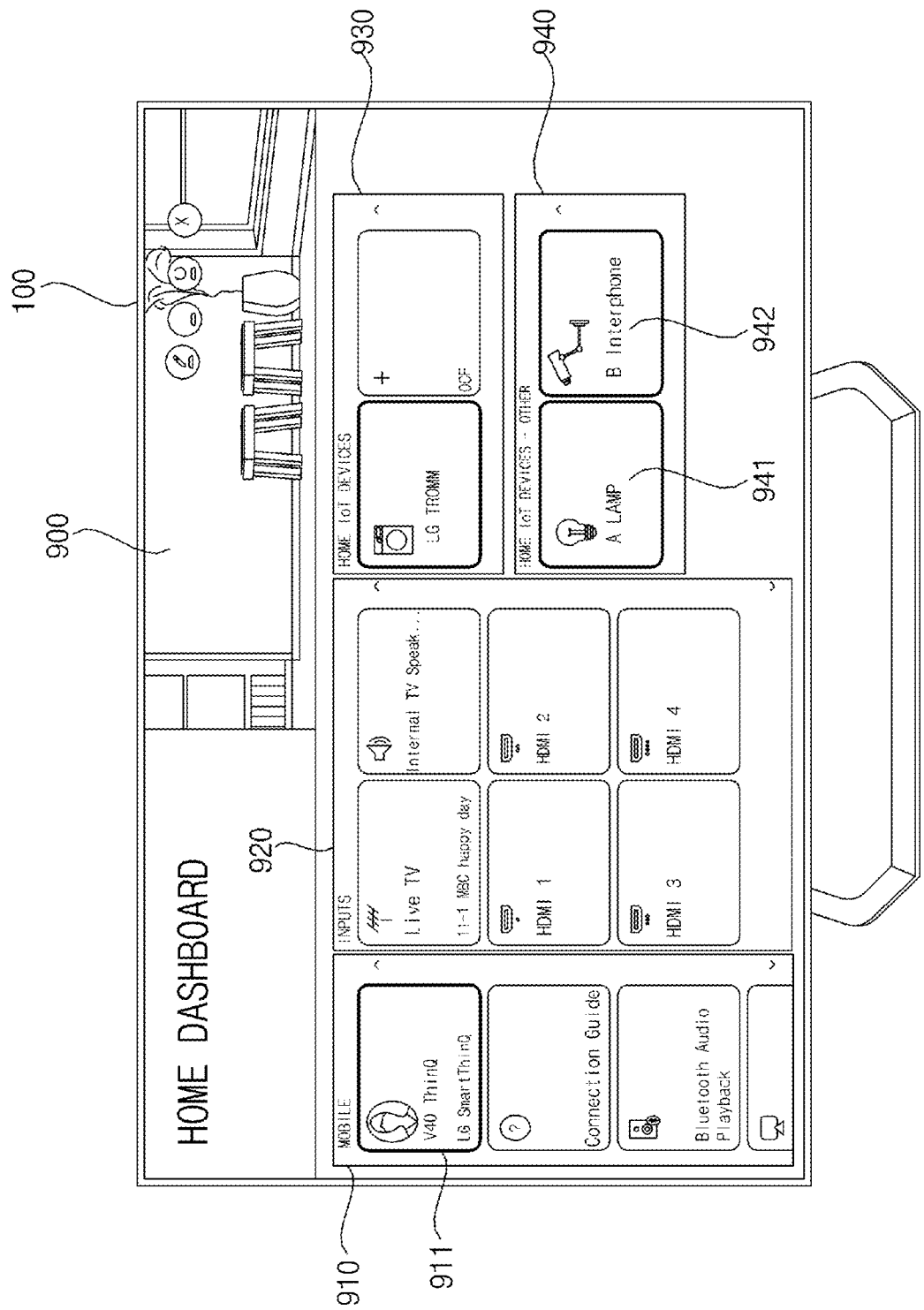
Figure 10:
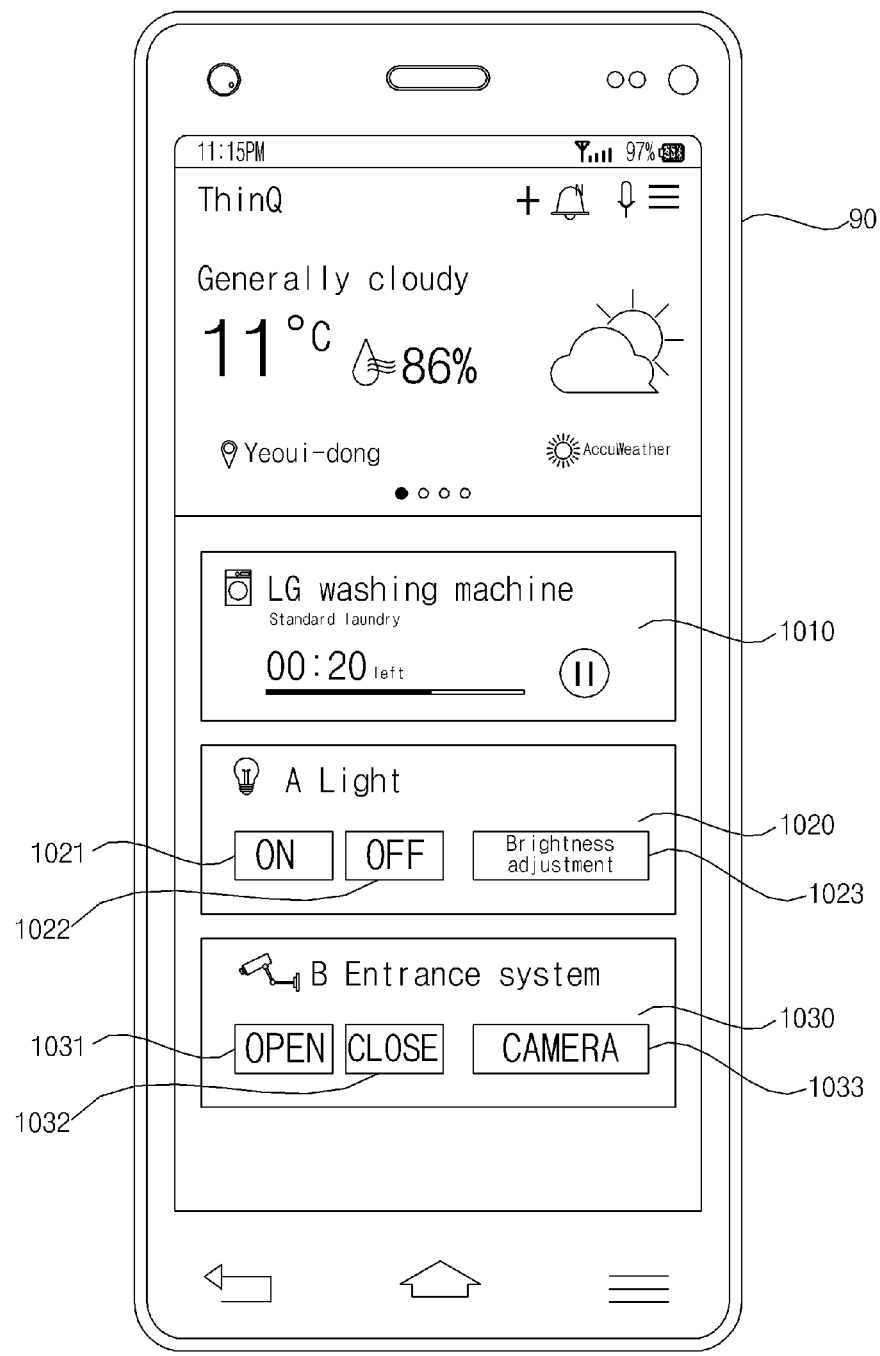

FIGS. 6A to 7 are flowcharts of an operation method of a system according to an embodiment of the present disclosure, and FIGS. 8 to 10 are diagrams for explaining the operation method of the system.

Referring to FIG. 6A, the image display device 10 may transmit device information (e.g. an identifier, a serial number, a model number, manufacturer information, a medium access control (MAC) address, etc.) of the image display device 10 to the first external device 30, at operation S601.

For example, the image display device 10 may transmit a signal including device information of the image display device 10 to the first external device 30 by using Universal Plug and Play (UPnP) which is a protocol that provides a device and service search in a local network.

For example, the image display device 10 may transmit a BLE signal including device information of the image display device 10 to the first external device 30 in a broadcasting manner.

Meanwhile, when the remote control device 20 and the first external device 30 are disposed close to each other, the device information of the image display device 10 stored in the remote control device 20 may be transmitted to the first external device 30, through a NFC communication.

The first external device 30 may generate authentication data based on the device information of the image display device 10, at operation S602. For example, the first external device 30 may generate an authentication number corresponding to the device information of the image display device 10, by using at least one of an identifier, a serial number, and a model number.

The first external device 30 may transmit the generated authentication data to the image display device 10, at operation S603. For example, the first external device 30 may transmit the generated authentication data to the image display device 10, based on the MAC address of the image display device 10.

The image display device 10 may output an authentication code corresponding to the authentication data through the display 180, at operation S604. Here, the authentication code may be composed of at least one of letter, number, and symbol corresponding to the authentication number included in the authentication data. For example, the authentication code may be a preset number of numeral or a Quick Response (QR) code.

Meanwhile, the image display device 10 may output audio for the authentication code corresponding to the authentication data through the audio output unit 185.

The first external device 30 may determine whether the image display device 10 is an authenticated device, at operation S605. For example, when a user photographs the QR code output through the display 180 of the image display device 10 through the camera 521 of the first external device 30, the first external device 30 may acquire an image including a QR code, when the QR code included in the image and the authentication number corresponding to the device information of the image display device 10 match, the image display device 10 may be determined as an authenticated device.

Alternatively, referring to FIG. 8, the image display device 10 may output an authentication code composed of a six-digit number through the display 180. At this time, a user may directly input the authentication code through the user input unit 530 of the first external device 30, for example, a touch screen, and when the authentication code composed of a six-digit number and the authentication number corresponding to the device information of the image display device 10 match, the first external device 30 may determine the image display device 10 as an authenticated device.

Referring back to FIG. 6A, the first external device 30 may transmit the device information of the image display device 10 to the first server 70, when it is determined that the image display device 10 is an authenticated device, at operation S606. Here, the first server 70 may be a server in which the device information of the first external device 30 and the device information of the second external device 40 are registered, in relation to the operation control of the second external device 40.

The first server 70 may generate an authentication token corresponding to the device information of the image display device 10 received from the first external device 30, at operation S607. For example, the first server 70 may generate an authentication token corresponding to the device information of the image display device 10, by using at least one of an identifier, a serial number, and a model number.

Meanwhile, the first server 70 may determine the image display device 10 corresponding to the authentication token as an authenticated device, and may store the authentication token of the image display device 10.

The first server 70 may transmit the generated authentication token to the first external device 30, at operation S608. Meanwhile, the first server 70 may transmit an encryption code corresponding to the authentication token, together with the authentication code, to the first external device 30. Here, the encryption code may be used to generate one-time temporary information by using an authentication token.

The first external device 30 may transmit the authentication token received from the first server 70 to the image display device 10, at operation S609. Meanwhile, the first external device 30 may transmit the encryption code received from the authentication first server 70 together with the authentication code to the image display device 10.

At operation S610, the first external device 30 may transmit data related to the second external device 40 and at least one control command related to the control of the second external device 40 to the image display device 10. Here, the data related to the second external device 40 may include an identifier, a serial number, a model number, manufacturer information, a MAC address, and the like.

At operation S611, the image display device 10 may store the authentication token received from the first external device 30, the data related to the second external device 40, and at least one control command in the storage unit 140.

Referring to FIG. 9, on a home screen 900 of the image display device 10, information 910 related to devices that have established a communication channel with the image display device 10 may be displayed. For example, the information 910 related to a mobile terminal may include information 911 related to a mobile terminal that is paired through a BLUETOOTH method, or the like and communication-connected, or information related to a device capable of communicating through a local network.

On the home screen 900 of the image display device 10, the information 910 related to various input/output units provided in the image display device 10 may be displayed. For example, the information 910 related to the input/output unit may include information related to the broadcast reception unit 105, the A/V input/output unit, the audio output unit 185, and the like.

On the home screen 900 of the image display device 10, information 930, 940 related to devices connected to the image display device 10 through the Internet of Things function may be displayed. For example, on the home screen 900 of the image display device 10, information 930 related to other device (e.g. washing machines) of a manufacturer of the image display device 10 registered by a user, and information 941, 942 related to the second external device 40 (e.g. the interphone 40a, the lighting system 40b) received from the first external device 30 may be displayed separately.

Referring back to FIG. 6A, at operation S612, the image display device 10 may receive a user input in response to at least one control command, and map the received user input and at least one control command, respectively. More specifically, the image display device 10 may output a message requesting setting of a user input corresponding to any one of at least one control command, and may map a user input received through the user input interface unit 150 or the input unit 160 with a corresponding control command.

For example, the image display device 10 may output a message for requesting the setting of a user input corresponding to a control command for unlocking a front door (i.e. a door) by the second external device 40 (e.g. the interphone 40*a*) through the display 180, and may map a user input of pressing a specific button of the remote control device 20 received through the user input interface 150, for example, a user input of simultaneously pressing a power button and a mute button, with a corresponding control command.

For example, the image display device 10 may output a message for requesting setting of a user input corresponding to a control command for turning on the power of the second external device 40 (e.g. the lighting system 40*b*) through the audio output unit 185, and may map a voice received through the microphone of the input unit 160, for example, a voice "turn on the light" with a corresponding control command.

Referring to FIG. 6B, at operation S613, the image display device 10 may receive a user input corresponding to any one of at least one control command related to the control of the second external device 40.

At operation S614, the image display device 10 may generate a control signal, based on the authentication token and a control command corresponding to the user input. For example, when a voice including "turn on the light" is received through the microphone of the input unit 160, the image display device 10 may generate a control signal including an authentication token and a control command for turning on the power of the second external device 40 (e.g. the lighting system 40*b*).

Meanwhile, the image display device 10 may generate one-time temporary information using the authentication token, based on the encryption code, and may generate a control signal including the generated one-time temporary information and a control command, instead of the authentication token. For example, the image display device 10 may generate encrypted one-time temporary information by combining the time when the user input is received and the authentication token according to the encryption code.

At operation S615, the image display device 10 may transmit a control signal to the second external device 40, based on the data related to the second external device 40.

At operation S616, the second external device 40 may transmit the authentication token included in the control signal received from the image display device 10 to the first server 70. Meanwhile, when the control signal received from the image display device 10 includes one-time temporary information, the second external device 40 may transmit the one-time temporary information to the first server 70.

At operation S617, the first server 70 may check whether the authentication token received from the second external device 40 is an authentication token corresponding to the authenticated device. Meanwhile, when receiving the one-time temporary information from the second external device 40, the first server 70 may decrypt the one-time temporary information, based on the encryption code corresponding to the authentication token, and check by extracting the authentication token from the decrypted one-time temporary information.

At operation S618, the first server 70 may transmit a result of checking the authentication token to the second external device 40. For example, the result of checking the authentication token may include a result of checking whether the authentication token is an authentication token corresponding to an authenticated device or is an authentication token corresponding to an un-authenticated device.

At operation S619, the second external device 40 may determine whether to perform an operation according to the control command included in the control signal, based on the result of checking the authentication token received from the first server 70. For example, when it is checked that the authentication token received from the image display device 10 is an authentication token corresponding to the authenticated device, the second external device 40 may perform an operation of turning on the power of the second external device 40 (e.g. the lighting system 40*b*), according to a control command included in the control signal.

Meanwhile, at operation S620, the image display device 10 may transmit a control signal to the first server 70. In this case, the control signal transmitted to the first server 70 may further include data related to the second external device 40.

At operation S621, the first server 70 may determine whether the authentication token included in the control signal received from the image display device 10 is an authentication token corresponding to the authenticated device.

At operation S622, the first server 70 may determine whether to transmit the control command included in the control signal to the second external device 40, based on the check result of the authentication token included in the control signal received from the image display device 10. For example, when it is checked that the authentication token received from the image display device 10 is an authentication token corresponding to the authenticated device, the first server 70 may transmit a control command for turning on the power of the second external device 40 (e.g. the lighting system 40*b*) to the second external device 40, based on the data related to the second external device 40.

At operation S623, when a control command is received from the first server 70, the second external device 40 may perform an operation according to the received control command. For example, the second external device 40 may perform an operation of turning on the power of the second external device 40 (e.g. the lighting system 40*b*), according to the control command received from the first server 70.

Meanwhile, referring to FIG. 7, the image display device 10 may transmit an authentication token to the second server 80, at operation S701. Meanwhile, the image display device 10 may transmit an encryption code corresponding to the authentication token to the second server 80 together with the authentication code.

The image display device 10 may transmit data related to the second external device 40 and at least one control command related to the control of the second external device 40 to the second server 80, at operation S702.

The second server 80 may store the authentication token received from the image display device 10, the data related to the second external device 40, and at least one control command, at operation S703.

The third external device 90 may receive a user input for any one of at least one control command related to the control of the second external device 40, at operation S704.

Here, the third external device 90 may be a device used by a user who can access the second server 80, and may include all or part of the components included in the first external device 30 shown in FIG. 5. In addition, the third external device 90, all or part of the operations performed in the first external device 30 may be executed in the second external device 40.

The third external device 90 may transmit a user input signal corresponding to the user input to the second server 80, at operation S705.

Referring to FIG. 10, when a user logs in to the second server 80 by using the third external device 90, the third external device 90 may display information related to various devices stored in the second server 80 on a screen.

The third external device 90 may display information 1010 related to other device (e.g. washing machines) of a manufacturer of the image display device 10 registered by a user on a screen.

In addition, the third external device 90 may display information 1020, 1230 related to the second external device 40 received by the second server 80 from the image display device 10 on a screen. For example, when the second server 80 receives data on the interphone 40*a* and the lighting system 40*b*, and at least one control command related to the control of each device from the image display device 10, item (1021 to 1023, 1031 to 1033) corresponding to each of at least one control command may be displayed in the information (1020, 1230) related to each device.

At this time, when a user input for selecting any one of the items (1021 to 1023, 1031 to 1033) corresponding to each of the at least one control command is received, the third external device 90 may transmit a user input signal corresponding to the received user input to the second server 80. For example, when a user selects an item 1031 corresponding to the control command for unlocking a front door, the third external device 90 may transmit a user input signal notifying the selection of a corresponding item 1031 to the second server 80.

Referring back to FIG. 7, at operation S706, the second server 80 may generate a control signal, based on a user input signal received from the third external device 90. For example, when a user input signal notifying the selection of the item 1031 corresponding to the control command for unlocking the front door is received from the third external device 90, the second server 80 may generate a control signal including an authentication token and a control command for unlocking the front door by the second external device 40 (e.g. the interphone 40*a*).

Meanwhile, the second server 80 may generate one-time temporary information using the authentication token, based on the encryption code, instead of the authentication token, the generated one-time temporary information may be used to generate a control signal including a control command for unlocking the front door by the second external device 40 (e.g. the interphone 40*a*). For example, the second server 80 may generate encrypted one-time temporary information by combining the time when the user input signal is received from the third external device 90 and the authentication token according to the encryption code.

The second server 80 may transmit a control signal to the first server 70, at operation S707. In this case, the control signal transmitted to the first server 70 may further include data related to the second external device 40.

The first server 70 may check whether the authentication token included in the control signal received from the second server 80 is an authentication token corresponding to the authenticated device, at operation S708.

The first server 70 may determine whether to transmit the control command included in the control signal to the second external device 40, based on the check result for the authentication token included in the control signal received from the second server 80, at operation S709. For example, when it is determined that the authentication token received from the second server 80 is an authentication token corresponding to the authenticated device, the first server 70 may transmit a control command for unlocking the front door by the second external device 40 (e.g. the interphone 40*a*) to the second external device 40, based on the data related to the second external device 40.

When a control command is received from the first server 70, the second external device 40 may perform an operation according to the received control command, at operation S710. For example, the second external device 40 may perform an operation of unlocking the front door by the second external device 40 (e.g. the interphone 40*a*), according to the control command received from the first server 70.

As described above, according to various embodiments of the present invention, based on the data transmitted/received between the first external device 30, which is an existing master device that has completed an authentication for the second external device 40 which is a control target, and the image display device 10, an authentication procedure between the first external device 30 that is an existing master device, and the image display device 10 is performed, thereby easily completing authentication between the image display device 10 and the second external device 40, and automatically adding the image display device 10 as a master device.

In addition, according to various embodiments of the present disclosure, since the image display device 10 can control the operation of the second external device 40 by using the authentication token or one-time temporary information generated by the first server 80, there is no room for device information of the image display device 10 to be exposed to the outside in operation control, thereby solving a security problem related to information of the image display device 10 and other devices.

The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

Meanwhile, the method of operating an image display device of the present disclosure can be implemented as processor-readable codes on a processor-readable recording medium provided in the image display device. The processor-readable recording medium includes all kinds of recording apparatuses storing data that can be read by a processor. Examples of the processor-readable recording medium is ROM, RAM, CD-ROM, magnetic tapes, floppy disks, optical data storage apparatuses, and, including those that are implemented in the form of carrier waves such as data transmission through the Internet. In addition, the processor-readable recording medium is dispersed in computer systems connected through a network, so that the processor-readable code can be stored and executed in a distributed fashion.

In addition, although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

The invention claimed is:

1. A method of operating a system including an image display device, a first external device, a second external device, and a first server associated with the second external device, the method comprising:
  an authentication operation between the image display device and the first external device comprising:
    generating, by the first external device, authentication data based on device information of the image display device, and transmitting the authentication data to the image display device according to a preset communication protocol;
    displaying, by the image display device, an authentication code composed of at least one letter, number, or symbol corresponding to the authentication data; and
    determining, by the first external device, the image display device as an authenticated device based on receiving information of the displayed authentication code corresponding to the authentication data;
  a transmission operation comprising:
    transmitting, by the first external device, device information of the image display device to the first server based on the image display device being determined as the authenticated device;
    generating, by the first server, an authentication token corresponding to the device information of the image display device, and transmitting the authentication token to the first external device; and
    transmitting, by the first external device to the image display device, the authentication token received from the first server, data related to the second external device, and at least one control command related to a control of the second external device; and
  a control operation comprising transmitting to the second external device, by the image display device, a control signal based on a user input received at the image display device to perform one of the at least one control command corresponding to the user input.

2. The method of claim 1, wherein the control operation further comprises generating, by the image display device, the control signal based on the authentication token and the one of the at least one control command corresponding to the user input.

3. The method of claim 2, further comprising:
  mapping, by the image display device, an assigned user input corresponding to each of the at least one control command such that one of the at least one control command related to a control of the second external device is performed based on input of a corresponding assigned user input to the image display device.

4. The method of claim 2, wherein:
  the control signal transmitted by the image display device to the second external device includes the authentication token, and
  wherein the control operation further comprises:
  transmitting, by the second external device, the authentication token included in the control signal to the first server;
  checking, by the first server, whether the authentication token received from the second external device corresponds to the device information of the image display device;
  transmitting, by the first server, a check result of the authentication token to the second external device; and
  determining, by the second external device, whether to perform the one of the at least one control command corresponding to the user input based on the check result.

5. The method of claim 2, wherein the control operation further comprises:
  transmitting, by the image display device, the control signal including the authentication token to the first server;
  checking, by the first server, whether the authentication token included in the control signal received from the image display device corresponds to the device information of the image display device; and
  determining, by the first server, whether to transmit the control signal for the one of the at least one control command corresponding to the user input to the second external device, based on a check result of the authentication token.

6. The method of claim 2,
  further comprising transmitting, by the image display device, the data related to the second external device, the one of the at least one control command, and the authentication token to a second server associated with the image display device.

7. An image display device comprising:
  a display configured to display an image;
  a user input receiver configured to receive a user input;
  a transceiver configured to transmit and receive a signal including data;
  a memory; and
  a controller configured to transmit and receive data to and from one or more external devices through the transceiver,
  wherein the controller is further configured to:
    receive data related to the image display device from a first external device through the transceiver, wherein the data related to the image display device comprises authentication data generated based on device information of the image display device; and
    output through the display an authentication code composed of at least one letter, number, or symbol corresponding to the authentication data to be provided to the first external device for determining the image display device as an authenticated device by the first external device;
    receive, through the transceiver, an authentication token generated by a first server associated with a second external device based on device information of the image display device provided by the first external device, data related to the second external device, and at least one control command related to control of the second external device from the first external device;
    store the received authentication token in the memory;
    generate the control signal for transmission to the second external device based on the authentication token and the one of the at least one control command corresponding to the user input; and
    transmit, to the second external device through the transceiver, a control signal for one of the at least one control command based on a user input received via the user input receiver corresponding to the one of the at least one control command.

8. The image display device of claim 7, wherein the controller is further configured to map a corresponding assigned user input to each of the at least one control command for performing one of the at least one control command related to a control of the second external device based on input of the corresponding assigned user input to the image display device.

9. The image display device of claim 7, wherein the control signal transmitted to the second external device includes the authentication token.

10. The image display device of claim 7, wherein the controller is further configured to transmit through the transceiver the control signal including the authentication token to the first server associated with the second external device.

11. The image display device of claim 7, wherein the controller is further configured to transmit, through the transceiver, the data related to the second external device, the at least one control command, and the authentication token to a second server associated with the image display device.

\* \* \* \* \*